US012792935B1

(12) United States Patent
Pattanaik et al.

(10) Patent No.: US 12,792,935 B1
(45) Date of Patent: Nov. 10, 2026

(54) ARTIFICIAL INTELLIGENCE RULE HEURISTICS AND DISTILLATION

(71) Applicant: The Bank of New York Mellon, New York, NY (US)

(72) Inventors: Sarthak Pattanaik, New York, NY (US); Vadim Pertsovskiy, Chicago, IL (US); Madhusudan Rana, Lake Mary, FL (US); Filipe Joao Cabrita Condessa, Pittsburgh, PA (US); Zachariah Tyree, New York, NY (US); Vanessa Vidic, Pittsburgh, PA (US); Nikunj Bhalla, Pune (IN); Shaik Abdur Rahman Nawaz, Pune (IN)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 19/351,262

(22) Filed: Oct. 6, 2025

(51) Int. Cl.
*G06N 5/02* (2023.01)
*G06N 5/025* (2023.01)

(52) U.S. Cl.
CPC .................................... *G06N 5/025* (2013.01)

(58) Field of Classification Search
CPC ........... G06N 5/025; G06N 5/022; G06N 5/02
See application file for complete search history.

(56) References Cited

U.S. PATENT DOCUMENTS 8,140,454 B2 * 3/2012 Bullen .................. G06Q 10/06 706/14
8,626,777 B2 * 1/2014 LeTourneau ........ G06F 16/9027 707/756
10,151,791 B1 * 12/2018 Spinner ................ G01R 1/0416
10,459,704 B2 * 10/2019 Su ........................... G06F 8/433
11,544,560 B2 * 1/2023 Leite Pinheiro de Paiva ............. G06F 16/957
11,928,015 B1 * 3/2024 Krein ...................... G06F 13/42
2006/0017557 A1 * 1/2006 Chung .................... G06F 21/55 340/541
2006/0095455 A1 * 5/2006 LeTourneau ........ G06F 16/2246
2007/0265870 A1 * 11/2007 Song ...................... G06Q 30/00 705/7.29
2008/0307002 A1 * 12/2008 Staroveska ......... G06F 16/4393
2009/0196291 A1 * 8/2009 Kung ...................... H04L 47/20 370/392

(Continued)

OTHER PUBLICATIONS

Chen et al., "AutoManual: Constructing Instruction Manuals by LLM Agents via Interactive Environmental Learning", Nov. 10, 2024, arXiv.com, 38th Conference on Neural Information Processing Systems (NeurIPS2024), pp. 1-37. (Year: 2024).*

(Continued)

*Primary Examiner* — Paulinho E Smith
(74) *Attorney, Agent, or Firm* — NORTON ROSE FULBRIGHT US LLP

(57) ABSTRACT

Rules, such as rules for performing matching operations among multiple data elements, may be adjusted and/or consolidated based on commonalities of the rules. For example, a set of processors executing an AI application may receive a set of rules including multiple rules, may determine commonalities among the multiple rules, and may generate a second set of rules based on the determined commonalities, where the second set of rules includes fewer rules than the first set of rules. The set of processors may determine matches of an input data set using the second set of rules.

19 Claims, 8 Drawing Sheets

(56) References Cited

U.S. PATENT DOCUMENTS

2009/0228445 A1* 9/2009 Gangal ............... G06F 16/2465 707/E17.05
2010/0036785 A1* 2/2010 Tzruya .............. G06Q 30/0251 706/45
2012/0084133 A1* 4/2012 Ross .................. G06Q 30/0226 709/224
2012/0239600 A1* 9/2012 Bollinger ............... G06N 5/025 706/46
2013/0041489 A1* 2/2013 Bradley .................. G10L 25/90 700/94
2013/0253371 A1* 9/2013 Saleh ..................... A61B 10/06 600/562
2014/0222505 A1* 8/2014 Tuzhilin ............. G06Q 30/0267 705/7.29
2015/0220972 A1* 8/2015 Subramanya ...... G06Q 30/0246 705/14.45
2015/0332171 A1* 11/2015 Nakagawa ............. G06N 5/025 706/14
2016/0054305 A1* 2/2016 He ......................... G01N 33/92 435/29
2016/0140212 A1* 5/2016 Hodas ................... G06F 16/444 707/738
2016/0277510 A1* 9/2016 Du .......................... H04L 43/50
2018/0046441 A1* 2/2018 Su ........................... G06F 8/433
2018/0130484 A1* 5/2018 Dimino, Jr. .... H04N 21/234336
2018/0182052 A1* 6/2018 Panagos ................. G06Q 10/10
2018/0276278 A1* 9/2018 Cagan ................. G06F 16/9024
2018/0365420 A1* 12/2018 Krylov .................... G06F 16/00
2019/0075167 A1* 3/2019 Je ............................ G10L 15/30
2019/0263912 A1* 8/2019 Haber ................ C07K 16/2833
2020/0059749 A1* 2/2020 Casimiro Ericsson ...................... G06F 3/017
2020/0067861 A1* 2/2020 Leddy ................. G06F 21/6245
2020/0272741 A1* 8/2020 Bhatia .................... G06F 40/284
2021/0090694 A1* 3/2021 Colley ................... G16B 30/00
2022/0083940 A1* 3/2022 Abolhassani ........... G06F 30/17
2022/0245540 A1* 8/2022 Nasciuti ............. G06Q 10/0637
2023/0289622 A1* 9/2023 Shang ................. G06F 16/4387
2023/0315405 A1* 10/2023 Morse ...................... G06F 8/425 717/143
2023/0342378 A1* 10/2023 Le Touneau .......... G06F 16/282
2024/0015518 A1* 1/2024 Montalvo ............... H04L 41/16
2025/0014052 A1* 1/2025 Bhattacharjee .......... G06N 5/01
2025/0080993 A1* 3/2025 Montalvo ............. H04W 16/10

OTHER PUBLICATIONS

R Documentation, "Graphical Representation of Edits", May 4, 2024, pp. 1-5, EditRules Version 2.9.5 (URL: https://search.r-project.org/CRAN/refmans/editrules/html/editrules.plotting.html) (Year: 2024).*

Koebler et al., "MoRE-LLM: Mixture of Rule Experts Guided by a Large Language Model", Mar. 26, 2025, arXiv.com, pp. 1-6. (Year: 2025).*

Li et al., "RuleR: Improving LLM Controllability by Rule-based Data Recycling", Feb. 15, 2025, arXiv.com, pp. 1-18 (Year: 2025).*

Hashler et al., "Visualizing Association Rules in Hierarchical Groups" May 2, 2016, Journal of Business Econ., vol. 87, pp. 317-335. (Year: 2016).*

* cited by examiner

ARTIFICIAL INTELLIGENCE RULE HEURISTICS AND DISTILLATION

FIELD OF THE DISCLOSURE

The instant disclosure relates to artificial intelligence (AI) systems and more particularly to systems and methods for AI rule heuristics and distillation.

BACKGROUND

Machine learning models are powerful tools for enhancing organizational efficiency and productivity. In particular, generative artificial intelligence (AI) applications and large language models (LLMs) are increasingly used in a wide variety of contexts. Such machine learning models are capable of receiving input data, such as plain language prompts, charts, formulae, images, and other forms of input data, and generating outputs based on the input data. For example, such models may be used for analyzing and recognizing features in images, analyzing medical records and data, reviewing and maintaining software libraries, analyzing transaction data, and evaluating workflow processes.

Artificial intelligence (AI) applications, such as AI applications, may implement a wide array of rules for analyzing input data sets to generate desired outputs. Such rule sets may become unwieldy, growing to thousands, millions, or even more rules over time. Rule sets of such sizes may consume large amounts of data storage, and selection of rules from such rule sets for data matching operations may be power and compute intensive.

Shortcomings mentioned here are only representative and are included simply to highlight that a need exists for enhanced AI rule heuristics and distillation. Embodiments described herein address certain shortcomings but not necessarily each and every one described here or known in the art. Furthermore, embodiments described herein may present other benefits than, and be used in other applications than, those of the shortcomings described above.

SUMMARY

A system for artificial intelligence (AI) rule heuristics and distillation may simplify a library of rules used by one or more AI applications to determine matching data elements from a set of input data. For example, a AI system may maintain a library of rules for performing matching operations on input data sets. Such rules may, for example, comprise computer code, in the form of one or more computer code modules, for performing particular matching operations on an input data set. Rules that are duplicative or similar may be determined through performing a similarity analysis on the rules and/or components of the rules. The similarity analysis may be used to combine, or condense, the rule set into a second set of rules, or rule components, that is more refined and less complex than the initial library of rules. For example, a size and/or complexity of the initial library of rules may be reduced. Such simplification may reduce an amount of storage required for maintaining the library of rules and may reduce the complexity of the library of rules, facilitating a reduction in time and/or processing capacity used in selection and/or execution of one or more of the rules to perform matching operations on an input data set. A system for AI rule heuristics and distillation may also facilitate determination of an order in which selected rules should be applied to an input data set, and such determination may allow for enhanced accuracy, reduced processing capacity usage, and/or reduced power usage in matching operations performed using the rules.

An example method for rule distillation and heuristics may include receiving, by one or more processors executing an AI application, a first set of two or more rules. For example, the one or more processors may access and/or select the first set of two or more rules from a library of rules stored in a rules database. Alternatively or additionally, the one or more processors may receive the first set of two or more rules from one or more external computing systems, such as external computing systems executing other AI applications. In some examples, receiving the first set of two or more rules may comprise generating the first set of two or more rules, such as through analysis of matching data elements received by the two or more processors to determine rules applied by one or more human operators in generating the matching data elements. In some examples, the AI application may include a generative AI application, such as one or more large language models (LLMs).

The one or more processors executing the AI application may determine a first set of one or more commonalities between the two or more rules. For example, the one or more processors may determine one or more attributes, features, and/or components that are shared by two or more rules of the first set of rules. Determining the first set of one or more commonalities may include determining a first computer code segment of a first rule of the first set of two or more rules having a similarity above a threshold level to a second computer code segment of a second rule of the first set of two or more rules. Commonalities may, for example, include shared or matching steps, flows, and/or processes of computer code of two or more rules. Thus, a determined commonality may be a shared code segment, or a code segment having a similar or the same function, across multiple rules of the first set of two or more rules.

In some examples, the one or more processors executing the generative AI application may generate a first prompt instructing the AI application to determine the first set of one or more commonalities between the two or more rules, and determining the first set of one or more commonalities may be performed in accordance with the first prompt. The first prompt may, for example, be a first large language model (LLM) prompt. For example, the one or more processors may input the first prompt into an LLM of the AI application, may execute the LLM, and may receive the first set of one or more commonalities between the two or more rules as an output of the LLM. In some examples, the first prompt may include computer code of the two or more rules of the first set and text instructing an LLM of the AI application as to a requested format and content of the one or more commonalities.

In some examples, the one or more processors executing the AI application may receive a second set of commonalities of the first set of two or more rules. For example, one or more commonalities of the first set of two or more rules may be predetermined, such as determined by a human operator or previously determined by the AI application or another AI application. Determining the first set of one or more commonalities may include modifying and/or updating one or more commonalities of the second set of commonalities. In some examples, the first set of one or more commonalities may be determined based on the second set of one or more commonalities, in addition to the first set of two or more rules. In some examples, the first prompt may include the second set of commonalities, in addition to the first set of two or more rules. The first prompt may be a prompt for instructing the LLM to update the first set of one or more commonalities using the first set of two or more rules. In some examples, determining the first set of commonalities may include adding one or more additional commonalities to the second set of commonalities and/or modifying one or more commonalities of the second set of commonalities. For example, determining the first set of commonalities may include removing redundant commonalities from the second set of one or more commonalities.

The one or more processors executing the AI application may generate a second set of one or more rules based on the first set of one or more commonalities. The second set of one or more rules may, for example, include a number of rules that is less than a number of rules of the first set of one or more rules. Accordingly, the second set of one or more rules may be a condensed version of the first set of one or more rules.

In some examples, the one or more processors executing the AI application may generate a second prompt for instructing the AI application to generate the second set of one or more rules based on the first set of one or more commonalities. The second prompt may, for example, be a second LLM prompt for an LLM executed by the AI application. The second prompt may include the determined first set of one or more commonalities. In some examples, the second prompt may include the first set of two or more rules, such as computer code of the two or more rules, and/or components of the first set of two or more rules, such as functions and/or segments of computer code of the first set of two or more rules. In some examples, the second prompt may include instructions for distilling the first set of two or more rules and/or reducing a number and/or complexity of the rules of the first set of two or more rules. Generating the second set of one or more rules may include inputting the second prompt into an LLM of the AI application, executing the LLM, and receiving the second set of one or more rules as an output of the LLM.

In some examples, the one or more processors may then determine one or more matches of an input data set in accordance with the second set of one or more rules. In some examples, such determination may include receiving an input data set, selecting one or more rules of the second set of one or more rules for performing one or more matching operations on the input data set, determining an order for application of the selected one or more rules, generation of a prompt instructing an LLM to apply the one or more rules, inputting the prompt into the LLM, executing the LLM to process the prompt, and receiving one or more matching data elements as an output of the LLM. Such a prompt may, for example, include the selected one or more rules, such as code of the selected one or more rules, an order of application of the two or more rules, the input data set, details regarding a requested format and/or content of the matching data elements, and other information for use by the LLM in generating the output.

In some examples, the one or more processors executing the AI application may determine one or more components of a first rule of the first set of rules and one or more components of a second rule of the first set of rules. Determining the first set of one or more commonalities may include determining one or more commonalities between the one or more components of the first rule and the one or more components of the second rule.

In some examples, the one or more processors executing the generative AI application may generate a third prompt instructing the AI application to determine one or more components of the first rule of the first set of rules and one or more components of a second rule of the first set of rules. For example, a prompt instructing an LLM of the AI application to decompose rules into their constituent steps, flows, and/or processes may be generated. The one or more processors executing the AI application may then determine the one or more components of the components of the first rule and the one or more components of the second rule in accordance with the third prompt. For example, the third prompt may be provided to an LLM of the AI application, the LLM may execute the prompt, and the LLM may output one or more components of the first rule and one or more components of the second rule. The components may, for example, be code segments of the first rule and code segments of the second rule. In some examples, determining the first set of one or more commonalities may include determining one or more commonalities between the one or more components of the first rule and the one or more components of the second rule. In some examples, determining the one or more commonalities between the one or more components of the first rule and the one or more components of the second rule may include linking the first rule and the second rule together in a graph with an edge strength associated with a number of components in common between the first rule and the second rule. In some example, more than two rules may be linked together in such a graph.

In some examples, a system may include a memory and one or more processors communicatively coupled to the memory and configured to perform the operations described herein. In some examples, a non-transitory computer-readable storage medium may store instructions that, when executed by one or more processors, cause the one or more processors to perform the operations described herein.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

An artificial intelligence (AI) rule distillation and heuristics system may enhance the operational efficiency of AI systems. For example, such a system may receive and/or generate a library of rules for performing matching operations on input data sets. Such libraries of rules may be extensive and complex, requiring large amounts of computer processing capacity, storage, and power to maintain and utilize. For example, some rule libraries may have thousands, millions, or even more rules. An AI rule distillation and heuristics system may simplify an input library of rules by combining rules that are similar and/or eliminating duplicative rules. Such a system may, for example, break rules down into their components, such as into their constituent flows, processes, and steps, compare the rule components (and in some cases entire rules) to detect similarities, and generate a new library of components and/or rules based on the detected similarities. The new library may be less complex and extensive than the library prior to rule distillation, requiring less power and computer storage to maintain and utilize while still providing accurate matching outputs. For example, the rules and/or components of the new library may require less computer storage space than the input library. Likewise, selection of rules for use in performing matching operations on an input data set may be less complex due to a reduced number of rules and/or a reduced complexity of the rules themselves. Such a reduction in complexity may enhance operation of computer systems executing such algorithms, enabling reduced power consumption, a reduced amount of time required for rule selection, and a reduced processing capacity required for selecting one or more rules for application to an input data set. Further a reduction in complexity of a library of rules may reduce an AI or human operator monitoring span for evaluation execution of the rules, such as for evaluating whether outputs of the rules are high quality. For example, performance of rules of a library of fewer and/or less complex rules may be evaluated more rapidly, through execution of the rules on real or test input data, when the library of rules has fewer and/or less complex rules.

In some examples, the system for AI rule distillation and heuristics may enhance an efficiency of application of rules to generate matching data elements as well. For example, the system may enable determination of an order in which to apply the rules that will result in a lowest power consumption, a lowest compute time and/or processing capacity, and/or a most accurate set of matching data elements. Such improvements may further enhance operational efficiency of computing devices executing AI applications.

Figure 1:
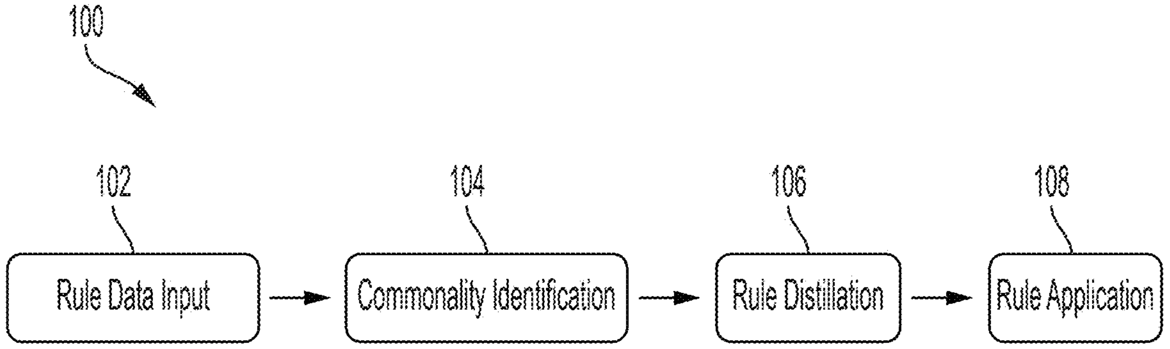
FIG. 1 is a block diagram of an example system for generative AI rule heuristics and distillation according to some embodiments of the disclosure.

An example system 100 for AI rule distillation and heuristics is shown in FIG. 1. The system 100 may include a rule data input module 102. In some examples, the rule data input module 102 may receive one or more rules from a database or other computing system. In some examples, the rule data input module 102 may generate one or more rules. For example, the rule data input module 102 may receive matching data elements generated by one or more human operators and may generate one or more rules based on the one or more matching data elements. The rules received by the rule data input module 102 may, for example, include rules for performing matching operations on an input data set. Such matching operations may include the generation of matching data elements. Matching data elements may, for example, include one or more input data elements that are matched together and/or one or more input data elements that are matched to a particular tag. For example, input image data elements, such as medical imaging data elements or autonomous driving imaging data elements, that are similar may be matched together and/or matched to particular tags. As another example, input financial transaction data elements that are similar may be matched together and/or matched to particular tags. As one particular example, multiple small input transactions may be matched to offset a larger input transaction. As another example, input financial transaction data elements may be matched to particular concerns, such as fraud, regulatory concerns, or compliance concerns. The received rules may be applicable to performing matching operations on a particular type of input data elements or a variety of types of input data elements. The rule data received and/or generated by the rule data input module 102 may include computer code for performing one or more matching operations. For example, each rule may comprise modular computer code for performing a particular matching operation In some examples, other kinds of data may be received by the rule data input module 102, such as data indicating components of one or more rules.

A commonality identification module 104 may identify one or more commonalities between one or more rules received and/or generated at the rule data input module 102. The commonality identification module 104 may, for example, decompose the rules into one or more components of each of the rules and may compare the rules to determine commonalities of each of the rules. Rule components, as described herein, may themselves be rules, extracted from larger, more complex rules. Decomposition of rules may include dividing the rules, such as by dividing the computer code of the rules, into their constituent steps, flows and/or processes. The commonality identification module 104 may, for example, perform similarity analysis on one or more rules and/or on one or more components of the rules to determine commonalities among the rules. Commonalities may include similar attributes of rules, such as components of rules that are the same or similar. For example, similar steps, flows, or processes determined to be components of multiple rules in an input rule set may be determined. In some examples, computer code of the rules may be compared to determine functions and/or segments of computer code of rules of the input rule data that have the same or similar functions. In some examples, the commonality identification module 104 may employ one or more large language models (LLMs) to determine the one or more commonalities. For example, the commonality identification module 104 may generate a prompt for determining commonalities of the rules received and or generated by the rule data input module 102 and may leverage the large language model (LLM) to execute the prompt to output the one or more commonalities.

Rule distillation module 106 may generate a new and/or updated set of rules based on commonalities identified by the commonality identification module. For example, rule distillation module 106 may minimize a number of rules in a library of rules received and/or generated by the rule data input module 102. Such minimization may be achieved through combining one or more similar rules into a single rule, eliminating one or more duplicative rules, and/or simplifying components of one or more rules. In some examples, such minimization may include generation of generalized rules that are applicable to multiple different types of input data based on rules having similar functions that are only applicable to a single type of input data. In some examples, the rule distillation module 106 may employ one or more LLMs to generate the new and/or updated set of rules. For example, the rule distillation module 106 may generate a prompt for generating a new and/or updated set of rules based on the commonalities determined by the commonality identification module 104 and may leverage the LLM to execute the prompt to output the one or more commonalities.

Rule application module 108 may then apply the new set of rules generated by the rule distillation module 106. For example, rule application module 108 may receive an input data set and may select one or more rules for application to the input data set. Rule application module 108 may, in some examples, select an order in which the selected rules should be applied to the input data set. For example, rule application module 108 may determine a most efficient order of application of selected rules, such as an order of application of the rules that will consume the least amount of power, will produce results in the least amount of time, and/or will produce results with a lowest usage of processing capacity. In some examples, rule application module 108 may determine an order of application of the selected rules that is the most likely to lead to a correct set of outputs when the rules are applied. In some examples, multiple factors, such as output quality and resource consumption, may be considered when determining an order in which selected rules should be applied.

In some examples, the rule distillation module 106 may generate new rules based on identified commonalities. For example, a rule-based approach, where rules are generated based on matching data elements generated by human operators, may suffer from unseen data weakness, as rules may be generated solely based on matching data elements generated by human operators. Thus, latent models and/or rules can only be extracted for those seen data sets. Although many patterns may tend to repeat in accordance with the rules, new patterns that rhythm with patterns used to generate a library of rules may also be encountered. The rule distillation module 106 may further extract the latent representational structure and/or intuitive patterns of a large library of rules by generalizing such rules through commonality analysis. That is, the explicit representation of the original library of rules may be inverted into a heuristic distillation through inductive rule generalization. As one example, the rule distillation module 106 may iteratively distill the rules and learn the larger principles of the rules that can be added into an LLM prompt for in-context learning in matching data element generation. Such generalized rules may be implemented by the rule application module 108, for example, when an input data set that does not correspond to any of the rules of an initial rule set is received. In some examples, the more broad rules, or principles, that are determined by the rule distillation module 106 may be embedded into the core of an LLM model, which may further increase a degree of generalization and breadth of such rules. For example, the reinforcement learning fine tuning (RL) with supervised fine-tuning (SFT) or a similar method may be used for such embedding.

Figure 2A:
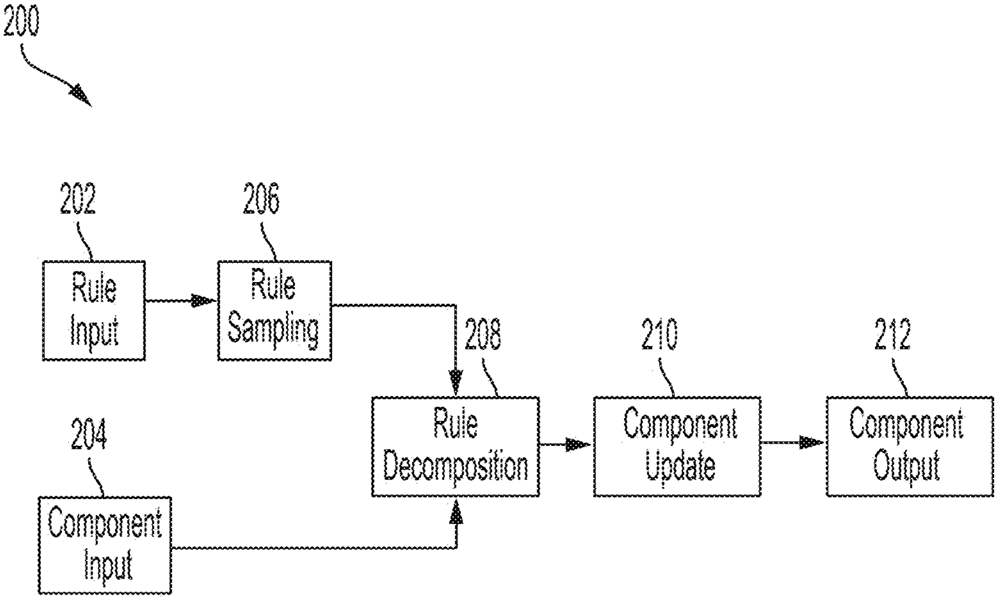
FIG. 2A is a block diagram of an example algorithm for rule decomposition learning according to some embodiments of the disclosure.
Figure 2B:
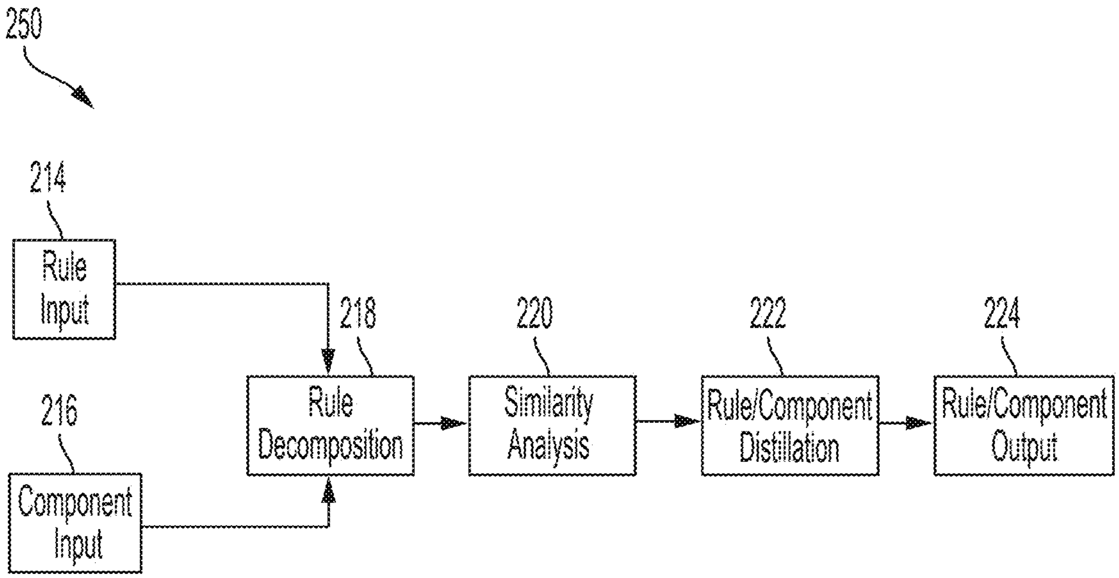
FIG. 2B is a block diagram of an example algorithm for rule commonality analysis according to some embodiments of the disclosure.

In some examples, rules may be decomposed into their components, and the components may be compared to determine commonalities between the rules, such as components that are shared by multiple rules and/or components that are similar in multiple rules. An example algorithm 200 for rule decomposition learning is shown in FIG. 2A, and an example algorithm 250 for rule similarity analysis is shown in FIG. 2B. The algorithms 200 and 250 may, for example, be executed by an AI application as described herein. The algorithm 200 may decompose an input rule set, R, into a structured set of rule components, $C_1$. In determining such a set of components, two trivial or degenerate solutions may produce component set outputs with minimal utility. For example, when the number of determined rule components $C_1$ is equal to a number of rules, N, in the input set of rules, the output rule components, $C_1$ may have reduced utility. Similarly, when the number of determined rule components $C_1$ is less than p, where at least one of the components of $C_1$ becomes a union of at least two rules with a routing or decision process deciding which of the rules to use, the output rule components may have reduced utility. To avoid such scenarios, a number of determined rule components, $C_1$, may be constrained in size. For example, the structure of the decomposition of each rule of the input set of rules, R, may be limited, such as by limiting a number of components of each rule. In some examples the algorithm 200 may be performed using a large language model that, provided a set or subset of input rules, R, and a set of components $C_2$, returns the decomposition of each of the rules in its component and an updated set of components $C_1$.

A rule input function 202 may receive one or more rules. The rules may, for example, be rules for performing one or more input data matching operations, as described herein. The one or more rules may, for example, be rules accessed from a library or database of rules and/or may be one or more rules generated by an AI application. In some examples, a set of rules, R, may include multiple rules, such as rule 1 through rule N, with N being the number of input rules, and may be received by the rule input function 202. The rules received by the rule input function 202 may, for example, be or include computer code, such as modular computer code, for performing particular matching operations.

In some examples, a component input function 204 may receive a set of previously determined components, such as previously determined components for the rules received by the rule input function 202. For example, component input function 204 may receive a set of previously determined rule components, $C_2$, previously determined to be in rules of the set of rules, R, received by the rule input function 202. The set of previously determined rule components, $C_2$, may may include multiple components, such as component 1 through component N, with N being the number of input components.

A rule sampling function 206 may sample the input set of rules, R, such as by selecting a subset of rules of the input set of rules, R, for decomposition. A number of rules sampled may be set by a human operator or may be automatically set by the AI application. In some examples, the number of rules sampled may be dynamically adjusted based on performance of the algorithm 200. In some examples, the rule sampling function 206 may be bypassed and/or may select the full set of rules, R, for decomposition.

A rule decomposition function 208 may decompose the rules sampled by the rule sampling function 206. For example, the rule decomposition function 208 may yield a decomposition of the sampled rules. In some examples, the rule decomposition function 208 may perform the decomposition based on the sampled rules received from the rule sampling function 206 and the set of previously determined rule components $C_2$ received from the component input function 204. For example, a set of components, $C_1$ output by the rule decomposition function 208 may be a set of components of each of the rules received from the rule sampling function 206 and/or the rule input function 202. Each of the components may, for example, be a portion of computer code of a rule, such as a step, flow, or process of the computer code. In some examples, components may, themselves, be rules of reduced complexity. Accordingly, each component output by the rule decomposition function 208 may be a member of a union of sets between the input set of previously determined rule components, $C_2$, and the new set of rule components determined by the rule decomposition function 208, $C_1$. As one example, the rule decomposition module 208 may output an ordered lists of elements of the union of sets between the input set of previously determined rule components, $C_2$, and the new set of rule components determined by the rule decomposition function 208, $C_1$. In some examples, when an input set of previously determined rule components is not received, a single set of rule components, $C_1$, determined based the input set of rules and/or sampled subset of the input set of rules may be returned by the rule decomposition function 208 and provided to the component output function 212.

A component update function 210 may merge the input set of previously determined rule components, $C_2$, with the set of rule components, $C_1$, determined by the rule decomposition function 208. For example, the component update function 210 may perform a merge function on the two sets of rule components $C_1$ and $C_2$ to generate an output set of rule components, C. In some examples, a clean function may be performed on the output set of rule components, C, to remove any duplicate components. A component output function 212 may then output the combined set of rule components, C, and/or may provide the output set of rule components, C, to the component input function 204 as a set of previously determined rule components for further component determination for additional sampled subsets of the set of rules, R.

In some examples, the rule sampling function 206, the rule decomposition function 208, and the component update function 210, and the component output function 212 may be repeated iteratively on different sample sets of the set of rules, R, received by the rule input function 202 until a decomposition learning stopping condition is met. Such a condition may, for example, be a reduction in a rate of new components determined by rule decomposition function 208, performance of the rule decomposition function 208 on a particular number of rules, a timing condition, or another condition.

The algorithm 250 of FIG. 2B may be executed to determine similarities between rules, which may allow for combination of rules and reduction in a size of a library of rules. The algorithm 250 may, for example, include a rule input function 214 and a component input function 216 similar to the rule input function 202 and the component input function 204 described with respect to FIG. 2A. The rule input function 214 may receive a set of rules from the component output function 212 of FIG. 2A or from another source of rules, such as a rule library or database. The component input function 216 may receive a set of components from the component output function 212 of FIG. 2A, or from another source. For example, the component input function 216 may receive a set of components, $C_2$, determined for a set of rules, R, received by the rule input function 214, or a combined set of components, C. A rule decomposition function 218 may function similarly to the rule decomposition function 208 of FIG. 2A. For example, the rule decomposition function 218 may decompose each rule of a set of rules received by the rule input function 214 into its constituent components. The rule decomposition function 218 may output a set of components $C_1$ determined for the set of input rules. For example, component sequences of each of the rules may be calculated. In some examples, an LLM may be prompted to perform the rule decomposition operations of the rule decomposition function 218.

A similarity analysis function 220 may perform one or more similarity analysis operations on a set of components $C_1$ output by the rule decomposition function. For example, the similarity analysis function 220 may compute a similarity between pairs and/or sets of rules of the set of rules, R, based on the input set of rules, R, and the received set of rule components $C_1$. In some example, multiple similarities may be computed for multiple different pairs and/or sets of rules based on the component sequences determined for each of the sets of rules. For example, a rule similarity matrix or graph S may be determined per pair of rules. Example similarity parameters that may be calculated may include Jaccard similarity between the decomposed component sequences of each of the rules, ignoring the ordering of the components, an Edit or Levenshtein distance between the decomposed component sequences of respective pairs of rules of the input set of rules, a longest common substring (LCS) length between the decomposed component sequences, including order normalizing the decomposed component sequence lengths, graph-based similarity parameters, and a cosine similarity between embeddings of decomposed component sequences if each path is embedded using an encoder, such as a graph or sequence/text based encoder. Thus, similarity analysis may be performed on one or more pairs of rules of the set of rules using component sequences received from the rule decomposition function 218 and a similarity matrix, S, may be output by the similarity analysis function 220. In some examples, the similarity analysis function 220 may determine one or more commonalities between the rules, such as one or more components of the rules having a high degree of similarity. In some examples, an LLM may be prompted to perform the similarity analysis operations of the similarity analysis function 220.

A rule/component distillation function 222 may generate a new set of rules, R', based on the similarity analysis performed by the similarity analysis function 220. The new set of rules, R', may be a simplified version of the input set of rules, R, including fewer and/or less complex rules than the input set of rules, R. For example, for two rules determined to have a high degree of similarity, a new rule may be computed, such as through generation of new computer code, for performing one or more overlapping functions of the two rules having a high degree of similarity. In some examples, the rule/component distillation function 222 may output a set of distilled components of the input set of rules as the new set of rules. The rule/component distillation function 222 may perform clustering and/or aggregation to provide clusters or hierarchical structures for the new set of rules, R'. In some examples, an LLM may be instructed to perform the rule/component distillation operations of the rule/component distillation function 222. A rule/component output function 224 may output the new set of rules, R', and the new set of rules may be used by the AI application for performing one or more matching operations on one or more sets of input data.

Figure 3:
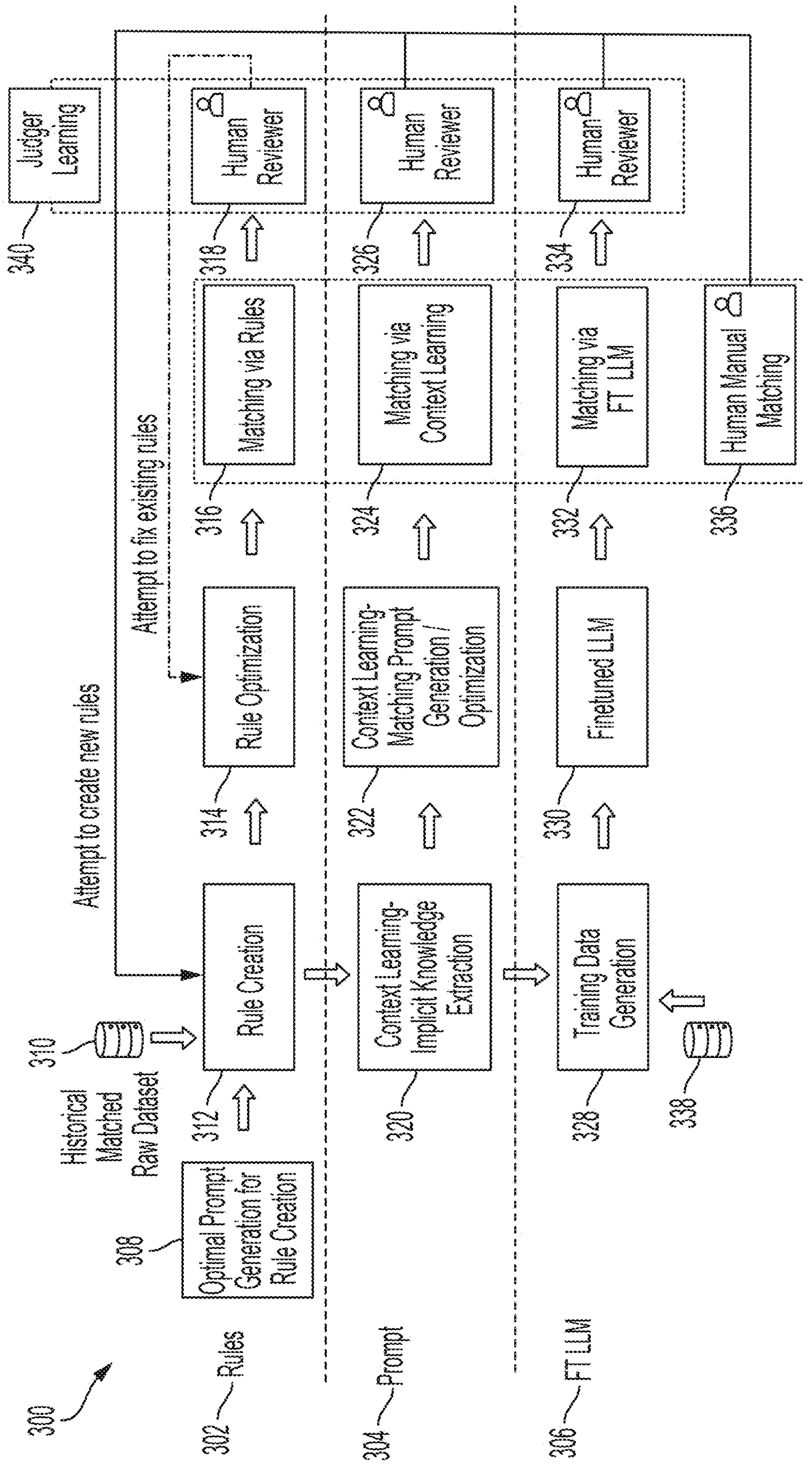
FIG. 3 is a block diagram of a system for latent model extraction and policy learning according to some embodiments of the disclosure.

A system 300, shown in FIG. 3, for latent model extraction and policy learning may be leveraged in the context of an AI rule heuristics and distillation system. The system 300 may be included in and/or may include one or more machine learning models and/or generative AI applications, such as one or more LLMs. Such a system 300 may be organized in layers of rule generation and/or optimization 302, prompt generation and/or optimization 304, and fine-tuned LLM generation and/or optimization 306. Module 308 may, for example, generate optimized/improved generative AI input prompts for rule creation. Such a module 308 may perform prompt and mock training data optimization, where an initial prompt is received from a user or another training source and the initial prompt is optimized using evaluation inputs related to rule generation. In some examples, the module 308 may be used to generate prompts for generating rules of a library of rules, as described herein. Prompts generated by the module 308 may be provided to a rule creation module 312. The rule creation module 312 may generate one or more rules based on the received prompt for performing one or more tasks. Rules may be further generated using a historical matched raw dataset 310, such as generated through manual human matching module 336. At rule optimization module 314, rules generated by the rule creation module 312 may be optimized, such as through use of human reviewer data from a human judging system where outputs from one or more generative AI applications or machine learning models using the rule(s) are reviewed by a human reviewer at human reviewer module 318 to determine a quality or correctness in form and content of the outputs. In some examples, rule optimization module 314 may perform rule heuristics and distillation on a library of rules generated by rule creation module 312, as described herein. For example, rule optimization module 314 may refine and/or distill a library of rules to generate a more condensed library of rules having a reduced number of rules. In some examples, rules, such as initially created rules or optimized rules, may be provided to a matching module 316 to perform one or more matching tasks using the rules, such as data matching tasks. The outputs of the matching module 316, and, in some embodiments, the associated rules, may be provided to a human reviewer module 318, to allow for review of matching outcomes using the rules, and the outcome of such review or evaluation, as described herein, may be used for further rule optimization.

Likewise, rules generated by rule creation module 312 may be used by context learning implicit knowledge extraction module 320 to generate prompts and/or new rules. For example, a purely rule-based approach may suffer from unseen data weakness, and latent models may be extracted exclusively for seen datasets. A number of patterns may repeat, but there may also be new patterns that are related to but do not fully fit prior patterns. Thus a latent model/representational structure and/or intuitive patterns may be generated based on the rules received from rule creation module 312, and other information sources. In some examples, the context learning implicit knowledge extraction module 320 may perform rule heuristics and distillation methods, as described herein, to reduce a number of rules in a library of rules generated by rule creation module 312.

A context learning matching prompt generation/optimization module 322 may generate LLM prompts for such context learning, based on outputs of the context learning implicit knowledge extraction module 320. For example, the context learning matching prompt generation/optimization module 322 may use the rules to iteratively generate prompts articulating the latent principles present in the rule set generated by the rule creation module 312. Such prompts may be provided to a matching module 324, for performing matching using the prompts, such as in a generative AI or LLM application. The outputs of the matching module 324 may be provided to a human reviewer module 326 for human review, and the human review outputs, such as indications of whether a format and/or content of the matching is or is not correct, along with the generated context learning matching prompts, may be provided to rule creation module 312 for further rule creation using the outputs.

A training data generation module 328 may further generate and/or optimize labeled or mock training data. Such training data may receive input training data from a source 338, such as a training dataset. The generated/optimized training data may be used to train a fine-tuned LLM, at fine-tuned LLM module 330. The fine-tuned LLM module 330 may, in some examples, be fine-tuned for matching tasks at its initialization in the system 300. In some examples, the fine-tuned LLM module 330 may become fine-tuned through training using training data generation module 328, such as training data generated based on generated prompts, optimized prompts, generated rules, matching outcomes using generated rules, human reviewer analysis of matching outputs, and other training data. As one particular example, data generated in the rules layer 302, the prompt layer 304, and the fine-tuned LLM layer 306 may be used to train the fine-tuned LLM 330 to enable the fine-tuned LLM to efficiently perform matching operations using a database of rules and/or other information. The fine-tuned LLM module 330 may be used to perform matching of datasets at matching module 332. The outputs of matching module 332 may be provided to human review module 334, and the outputs of the human review module 334 may be further used in rule creation by rule creation module 312. Similarly, a manual human matching module 336 may be used to match datasets, and such outputs may also be used in rule creation by rule creation module 312.

The manual human reviewer modules 318, 326, and 334 may be part of a judger learning subsystem 340, which may aggregate human review of matching outputs. The judger learning subsystem 340 may determine, based on outputs of human reviewer modules 318, whether a human reviewer is likely to judge an output as correct or incorrect. Human reviewer modules 318 may be supplemented and/or replaced by the judger learning subsystem 340 through an iterative process based on a confidence level of the judger learning subsystem 340 that a human reviewer would judge a matching output as correct or incorrect. Thus, rules may be generated, discovered, optimized, decomposed, distilled, and judged, and prompts and training data sets may be optimized for latent model extraction and policy learning.

Figure 4:
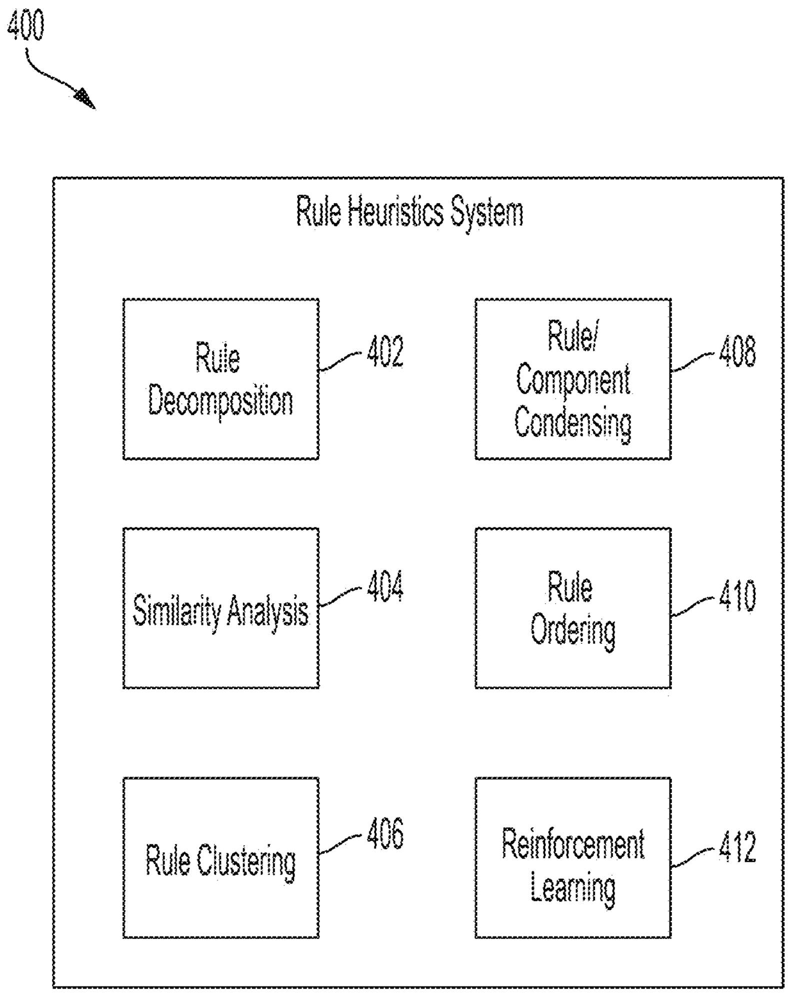
FIG. 4 is a block diagram of an example AI rule heuristics and distillation system according to some embodiments of the disclosure.

A block diagram of an example system 400 for AI rule heuristics and distillation is shown in FIG. 4. The system 400 may, for example, be executed by one or more computing devices, such as computing device 900 of FIG. 9. The system 400 may include multiple modules, such as multiple software modules. A rule decomposition module 402 may perform rule decomposition as described herein. For example, the rule decomposition module 402 may receive an input set of rules and may output a one or more components for each of the rules of the input set of rules. The rule decomposition module 402 may, for example, execute one or more AI agents, such as one or more LLM agents, to sample and decompose rules of a set of input rules, such as rules of library of rules. In some examples, the rule decomposition module 402 may generate a prompt for instructing a AI agent to perform rule decomposition. In some examples, the rule decomposition module 402 may determine a set of components for each of one or more rules. Rules may, for example, be or include computer code modules, and rule components may, for example, be segments or portions of computer code, such as steps, flows, or processes of the computer code.

A similarity analysis module 404 may determine similarities between rules or components of rules, such as similarities between components determined by the rule decomposition module 402. The similarity analysis module 404 may compute various similarity values and/or parameters between rules and/or components of rules as described herein. In some examples, the similarity analysis module 404 may determine commonalities shared by rules, such as rules that have a similar or the same function and/or components of rules that have a same or similar function. In some examples, the similarity analysis module 404 may execute one or more AI agents, such as one or more LLM agents, to determine a similarity between rules or rule components. In some examples, the similarity analysis module 404 may generate a prompt for instructing an AI agent to perform similarity analysis on one or more rules or components of rules.

A rule clustering module 406 may perform clustering on one or more rules based on the similarity analysis performed by the similarity analysis module 404, such as clustering based on one or more commonalities determined for one or more rules.

A rule/component condensing module 408 may condense an input set of rules based on similarities and/or commonalities determined by the similarity analysis module 404 and/or rule clustering performed by the rule clustering module 406. For example, the rule/component condensing module 408 may output a condensed version of the set of rules received by the rule decomposition module 402, such as a set of rules with a reduced number of rules and/or a reduced complexity. In some examples, the rule/component condensing module 408 may output a condensed version of a set of components determined by the rule decomposition module 402, such as through removing duplicate components and/or combining components that are identical or similar, in form or function.

A rule ordering module 410 may determine an order of application of one or more rules selected for performing one or more matching operations, as described herein. For example, the rule ordering module 410 may determine a best order for application of a set of rules selected for performing one or more matching operations on the input data set based on a most time efficient order for application of rules, based on a most processing usage efficient order for application of rules, based on an order of rules most likely to produce high quality matching outputs, and/or other criteria.

A reinforcement learning module 412 may select rules for performing one or more matching operations, as described herein, and may perform reinforcement learning operations in applying selected rules. For example, the reinforcement learning module 412 may generate prompts for executing one or more selected rules to perform matching operations on an input data set, may execute the prompts using an LLM agent to perform the one or more matching operations on the input data set, and may output one or more matching data elements.

In some examples, the reinforcement learning module 412 may function in a two-stage iterative approach that includes two LLMs and/or agents to develop a general recon agent. The reinforcement learning module 412 may include a prompt creation agent for generating prompts for rule execution by a rule execution agent of the reinforcement learning module 412. In some examples, the reinforcement learning module 412 may further include a prompt evaluation agent for evaluating outputs generated by the rule execution agent. The reinforcement learning module 412 may generate a template for a prompt indicating instructions and output format requirements for a matching operation to be performed by a prompt execution agent of the reinforcement learning module 412. For example, output format requirements may include a requirement to include <think> for each performed match and to place the matching data element inside a <match> block. The reinforcement learning module 412 may accordingly generate a prompt including one or more rules and/or rule components of a distilled rule set generated by rule component/condensing module 408. In some examples, the prompt generation agent of the reinforcement learning module 412 may further generate the prompt based on feedback from the prompt execution agent of the reinforcement learning module 412. In some examples, the prompt generation agent of module 412 may sample multiple prompts for execution by the prompt execution agent of module 412. The prompt execution agent of the reinforcement learning module 412 may then execute the prompt to perform one or more matching operations on a data set, such as a test data set or an input data set included in the prompt. A prompt evaluation agent of the reinforcement learning module 412 may evaluate the output of the prompt execution agent, such as one or more matches determined by the prompt execution agent of the module 412 and may provide feedback to the prompt generation agent of the module 412 and/or other modules regarding a performance of one or more generated prompts. For example, the output of the prompt execution agent of the module 412 may be evaluated against multiple reconciliation problems, and such evaluation may act as a reward function for the prompt generation agent of the module 412. This feedback may allow a prompt generation agent to improve future iterations of generated prompts for rule execution in matching operations. The module 412 may then generate an updated prompt for execution of the rules based on the feedback, the input rules, previously generated rules, and/or rule components, and such a prompt may be further executed and evaluated for performance. The process may continue to loop until a learning stopping criterion is achieved, such as a desired level of prompt performance. As one particular example, a trained prompt execution agent of the module 412 may be applied to execute one or more generated prompts including one or more rules for performing matching operations to a dataset of reconciliation or matching problems. For each output that corresponds to a correct matching process, evaluated by matching alignment, and a correct output format, sets of corresponding input data, prompt(s), and output matching data elements may be stored to build a high-quality supervised fine-tuning data set. This dataset may then be used to fine-tune an LLM, or a family of LLMs, to provide matching, reasoning, and explainability associated with the matching process. In some examples, the resulting LLM can be directly applied to operate as a recon agent.

In some examples, a prompt execution agent of the module 412 may operate in a single step process a multi-step process. In the single step process, performance of a prompt generation agent may be evaluated on the correctness of matches provided, based on precision and recall parameters, for the test data set, and based on a format of the output. In some examples, the prompt execution agent(s) may have access to a library of descriptions of available rules, tools, and/or rule components. In a multi-step approach, at each step of execution of the prompt by the prompt execution agent(s) of the module 412, the agent(s) may propose a match of data elements, request execution of an available tool, such as by finding a nearest semantically similar previously identified match, or request generation of a particular tool, such as through use of a dynamic programming solver. Upon completion of the multi-step approach, such as by completing all available matchings and/or reaching a maximum number of steps, the overall performance may be evaluated on a correctness of matches provided such as against precision and recall criteria, for the input data set, such as the test data set, based on the output format, based on the number of steps, and based on use of available tools.

In some examples, a full dataset required for rule-based matching operations, such as an input data set or testing data set, may be included as part of a prompt. In some examples, a dataset may be chunked according to similarity between different elements of the data set, such as similarity between different transactions, images, or other data elements, and other sets of highly similar data sets. Such chunking may be accomplished using an embedding trained on data similarity, such as transaction similarity or image similarity. Use of a chunked data set may be particularly useful in multi-step matching processes, as described herein, as similarity retrieval and other retrieval operations can be provided as tools to the prompt execution agent for use in steps of the matching process. Chunked data may be non-uniform in an amount of data elements, such as an amount of transactions, images, or other data elements, per chunk, and the chunking process may be performed with a goal of including as many transactions belonging to the same match as possible in the same chunk, via the trained embedding module.

Figure 5:
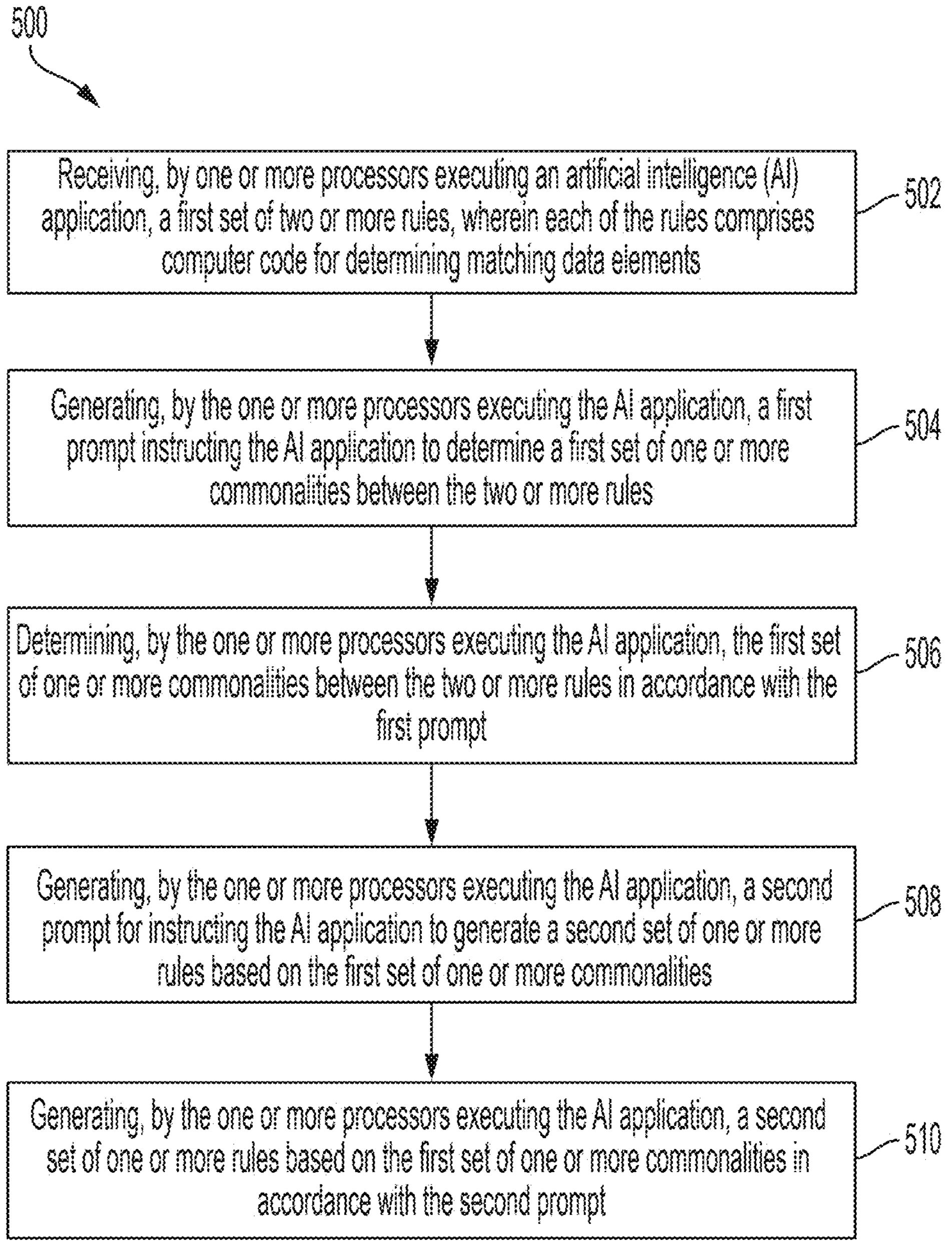
FIG. 5 is a flow chart of an example method for AI rule distillation according to some embodiments of the disclosure.

Matching process patterns that exist among a library of rules may be extracted and consolidated using rule distillation procedures, as described herein. For example, a broad understanding of core matching process components shared by rules of the rule set can allow such commonalities to be gathered in a toolkit for later use in match-finding prompts. This process may allow for a large library of rules to be consolidated into a smaller set of common rules, rule components or procedures. This more condensed set of rules or procedures may provide a set of tools or patterns for reconciliation and/or matching operations that can be provided to an LLM to equip the LLM with a general set of conceptual and cognitive tools for matching operations. A flow chart diagram of an example method 500 for AI rule distillation is shown in FIG. 5. One or more operations of the method 500 may be performed by the processors 912 of FIG. 9. The method 500 may, for example, be performed by executing a machine learning model, such as an AI application, using the one or more processors.

The method 500 may begin, at block 502, with receiving, by one or more processors executing an AI application, a first set of two or more rules. Each of the rules may comprise computer code for determining matching data elements. For example, each of the rules may comprise modular computer code for performing matching on an input data set to generate one or more matching data elements based on the matching data set. The first set of two or more rules may, for example, be a library of rules accessed in a database of rules. In some examples, the first set of two or more rules may include two or more rules sampled from library of rules. In some examples, the two or more rules may be generated by the AI application, or another AI application, based on matching data elements generated by human operators.

At block 504, the one or more processors executing the AI application may generate a first prompt for instructing the AI application to determine a first set of one or more commonalities between the two or more rules. The first prompt may, for example, include two or more rules and instructions for the AI application to determine commonalities shared by the rules. Commonalities may, for example, include attributes shared by multiple prompts of the set of prompts, such as steps, flows, and/or processes shared by the prompts. The first prompt may, for example, include an LLM prompt. In some examples, the first prompt may include instructions for the AI application to determine commonalities between components of rules, such as described with respect to the method 800 of FIG. 8. Such components may, for example, include steps, flows, and/or processes of the rules. For example, each component may include a code segment of each of the rules, such as a discrete code function of each of the rules. In some examples, the prompt may further include one or more previously determined commonalities of the set of rules, or a larger set of rules including the first set of rules, and the prompt may include instructions for the LLM to modify and/or add to the set of previously found commonalities between the rules based on the contents of a current rule batch. In some examples, the prompt may instruct the LLM to generate a set of commonalities for the first set of two or more rules without the added context of a previously determined set of commonalities. For example, the first set of two or more rules may be provided to the LLM, but one or more predetermined commonalities may not be provided. In some examples, a prompt for instructing the AI application to determine a first set of one or more commonalities between the two or more rules may include instructions for the AI application to compute one or more similarity parameters, such as one or more similarities between corresponding components of two or more rules. In some examples, the prompt may instruct the AI application to map each of the rules to sets of components determined to be in the rules. The prompt may include a batch of rules and the corresponding components of each of the rules as input context and may instruct the AI application to link the rules together in a graph with edge strength correlated to the number of components in common. The original rules and components within each set of rules can be leveraged as context in a prompt designed to instruct the AI application to generate versions of the rules that can be used directly or condensed. In some examples, the prompt may instruct the AI application, such as a prompt generated at block 508. In some examples, the first prompt may instruct the AI application to convert the textual components, or representations of components, of the first set of two or more rules into embeddings for computation of similarity scores between them. The first prompt may further instruct the AI application to compute such similarity scores, and groups of rules or components of rules having high similarity scores can be input together as batch context in an LLM prompt instructing the AI application to generate versions of rules that can be used correctly or condensed, such as a prompt generated with respect to block 508.

At block 506, the one or more processors executing the AI application may determine the first set of one or more commonalities between the two or more rules in accordance with the first prompt. For example, the one or more processors may input the prompt into the LLM, and the LLM may output a set of one or more commonalities, such as an updated set of commonalities shared by the one or more rules. In some examples, determining the first set of one or more commonalities may include adding to a previously found set of commonalities, such as by adding new commonalities among the current rule set which may be useful for future matching operations. In some examples, determining the first set of one or more commonalities may include modifying and adding to a previously determined set of commonalities for the batch of one or more rules, or for a larger batch of rules. For example, a first commonality of the previously determined set of commonalities may be modified and the modified version may be added to an output set of commonalities in addition to the first commonality. Thus the original commonality and the modified commonality may be included in a set of output commonalities. In some examples, the AI application may output a set of commonalities, such as an ordered set of commonalities, for each of the rules of the first set of two or more rules. In some examples, components of the rules may be determined even when the components are not common between two or more rules. For example, all components of each rule of the first set of two or more rules may be determined. Accordingly, such components may be used as context in future component determination prompts, such as prompts for determination of components of other sets of rules or sampled subsets of sets of rules. In some examples, the one or more processors executing the AI application may determine the first set of one or more commonalities between the two or more rules without generating a first prompt. For example, the one or more processors may determine the first set of one or more commonalities by analyzing the first set of one or more rules, such as through execution of one or more similarity analysis algorithms.

At block 508, the one or more processors executing the AI application may generate a second prompt for instructing the AI application to generate a second set of one or more rules based on the first set of one or more commonalities. The second prompt may, for example, instruct the AI application to condense an output set of commonalities, such as a combined set of previously determined commonalities and the commonalities determined at block 506, to generate a new set of output commonalities and/or rules. In some examples, such condensing, or distillation, may remove or combine rules or components that are duplicative, or similar in function. In some examples, the second set of one or more rules may include a set of condensed rule components, such as a set of flows, processes, or steps of one or more rules. For example, the second set of rules may include a set of modularized computer code components for performing one or more matching operations. The second prompt may, for example, comprise an LLM prompt. In some examples, the second prompt may include the one or more commonalities determined at block 506 and/or the two or more rules of the first set of rules.

At block 510 the one or more processors executing the AI application may generate a second set of one or more rules based on the first set of one or more commonalities in accordance with the second prompt. For example, the one or more processors may execute the prompt of block 508 to generate a second set of one or more rules. The second set of one or more rules may be a condensed version of the first set of two or more rules. For example, the second set of one or more rules may have fewer rules than the first set of two or more rules and/or rules of reduced complexity than the rules of the first set of two or more rules. In some examples, the one or more processors executing the AI application may generate the second set of one or more rules without generating a first prompt. For example, the one or more processors may generate the second set of one or more rules by analyzing the determined commonalities, and generating the rules based on the determined commonalities. For example, the second set of one or more processors may remove rules of the first set of one or more rules having duplicative or similar functions from the second set of one or more rules.

Figure 6:
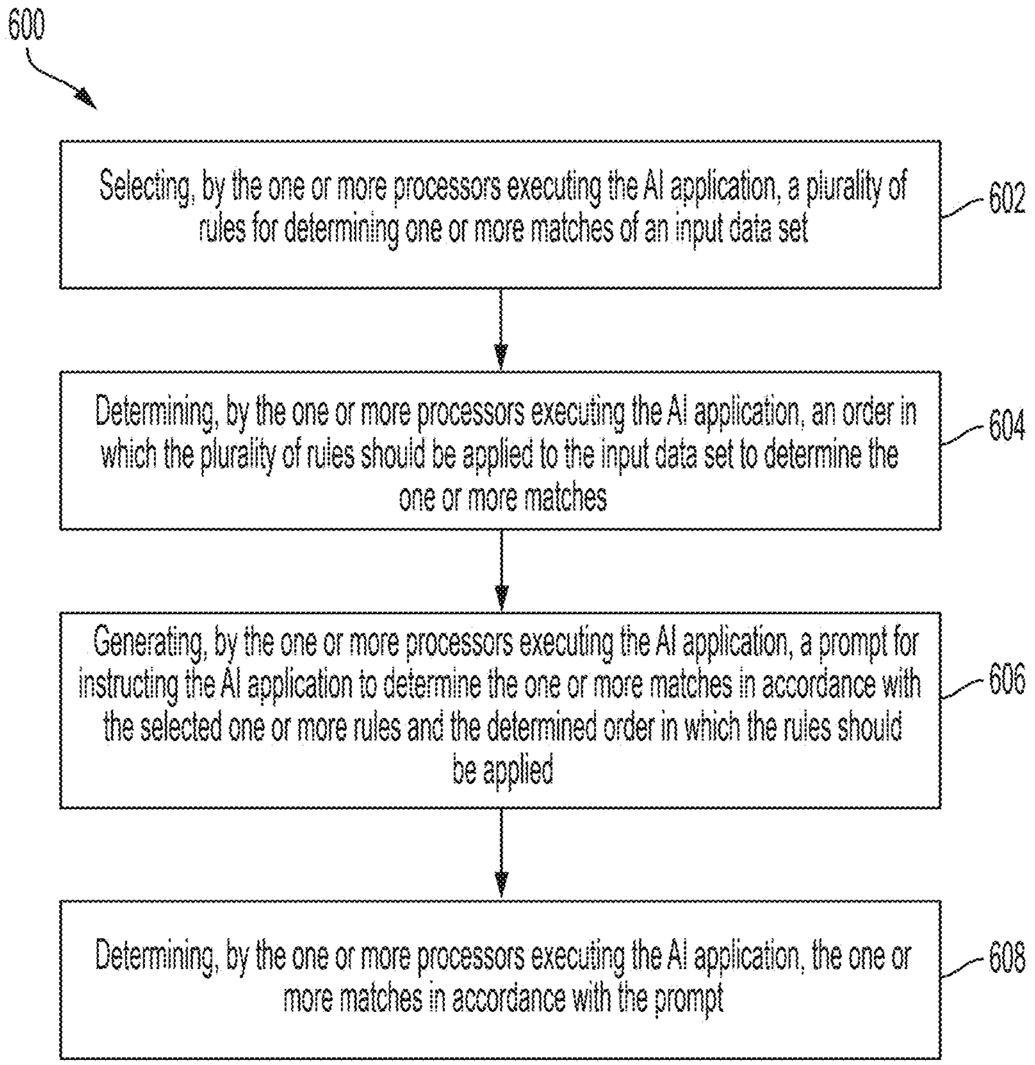
FIG. 6 is a flow chart of an example method for AI rule selection and execution according to some embodiments of the disclosure.

A flow chart diagram of an example method 600 for AI rule selection and execution is shown in FIG. 6. One or more operations of the method 600 may be performed by the processors 912 of FIG. 9. The method 600 may, for example, be performed by executing a machine learning model, such as an AI application, using the one or more processors. In some examples, the method 600 may be performed following the method 500 of FIG. 5, such as using a distilled rule set and/or set of rule components generated according to the method 500. The method 600 may begin, at block 602, with selecting, by the one or more processors executing the AI application, a plurality of rules for determining one or more matches of an input data set. For example, the one or more processors may receive and/or otherwise access an input data set, such as a set of training data or another set of input data, for performing one or more matching operations. For example, the input data set may include medical imaging data, financial transaction data, autonomous vehicle sensing data, or other data for performing one or more matching operations. The one or more processors may select one or more rules, such as one or more computer code modules, from a library of rules for performing one or more matching operations. In some examples, the one or more processors may select the plurality of rules based on characteristics of the input data, and in some examples, the one or more processors may select the plurality of rules based on inputs received from one or more human operators, such as selection of rules by the one or more human operators.

At block 604, the one or more processors executing the AI application may determine an order in which the plurality of rules should be applied to the input data set to determine the one or more matches. For example, a most efficient order of application of selected rules, such as an order of application of the rules that will consume the least amount of power, will produce results in the least amount of time, and/or will produce results with a lowest usage of processing capacity may be determined. In some examples, an order of application of the selected rules that is the most likely to lead to a correct set of outputs when the rules are applied may be determined. In some examples, multiple factors, such as output quality and resource consumption, may be considered when determining an order in which selected rules should be applied. Determining the order may, for example, include generating a prompt for an LLM to determine the order. The prompt may, for example, include the two or more rules, the input data set, instructions for determining the order, and/or other information. The prompt may then be input into an LLM of the AI application, and the AI application may output the order in which the rules should be applied.

At block 606, the one or more processors executing the AI application may generate a prompt for instructing the AI application to determine the one or more matches in accordance with the selected one or more rules and the determined order in which the rules should be applied. The prompt may, for example, include the input data set, the selected plurality of rules, and the order in which the rules should be applied. In some examples, the prompt may include instructions for executing the one or more rules on the input data set. The operations of block 606 may, for example, be performed by a prompt generation agent, such as described with respect to block 412 of FIG. 4.

At block 608, the one or more processors executing the AI application may determine the one or more matches in accordance with the prompt. For example, the one or more processors may execute the prompt generated at block 608. In some examples, a prompt execution LLM agent of the AI application may execute the prompt. In some examples, the operations at blocks 608 may be performed as described with respect to block 412 of FIG. 4.

Figure 7:
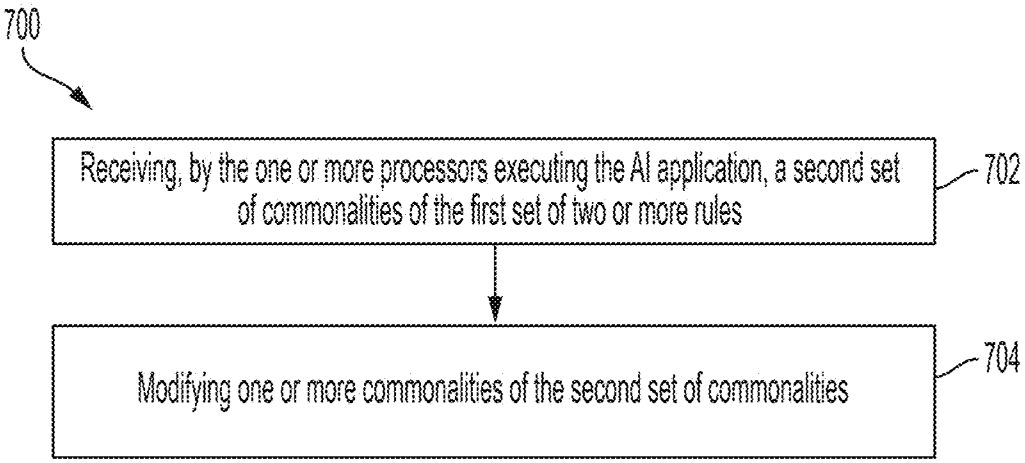
FIG. 7 is a flow chart of an example method for updating a AI rule commonality set according to some embodiments of the disclosure.

A flow chart diagram of an example method 700 for updating an AI rule commonality set is shown in FIG. 7. One or more operations of the method 700 may be performed by the processors 912 of FIG. 9. The method 700 may, for example, be performed by executing a machine learning model, such as an AI application, using the one or more processors. The method 700 may begin, at block 702, with receiving, by the one or more processors executing the AI application, a second set of commonalities of the first set of two or more rules. For example, the operations of block 702 may be performed along with, prior to, or following the operations of block 502 of FIG. 5. The second set of commonalities may be a previously determined set of commonalities for the first set of two or more rules received at block 502 of FIG. 5. At block 704, one or more commonalities of the second set of commonalities may be modified. In some examples, the second set of commonalities may be modified as part of determining the first set of commonalities at block 506 of FIG. 5. Thus, the commonalities determined at block 506 of FIG. 5 may be a modified version of the set of commonalities received at block 702 of FIG. 7. The modified set of commonalities may, for example, be used to generate the second set of one or more rules at block 510 of FIG. 5.

Figure 8:
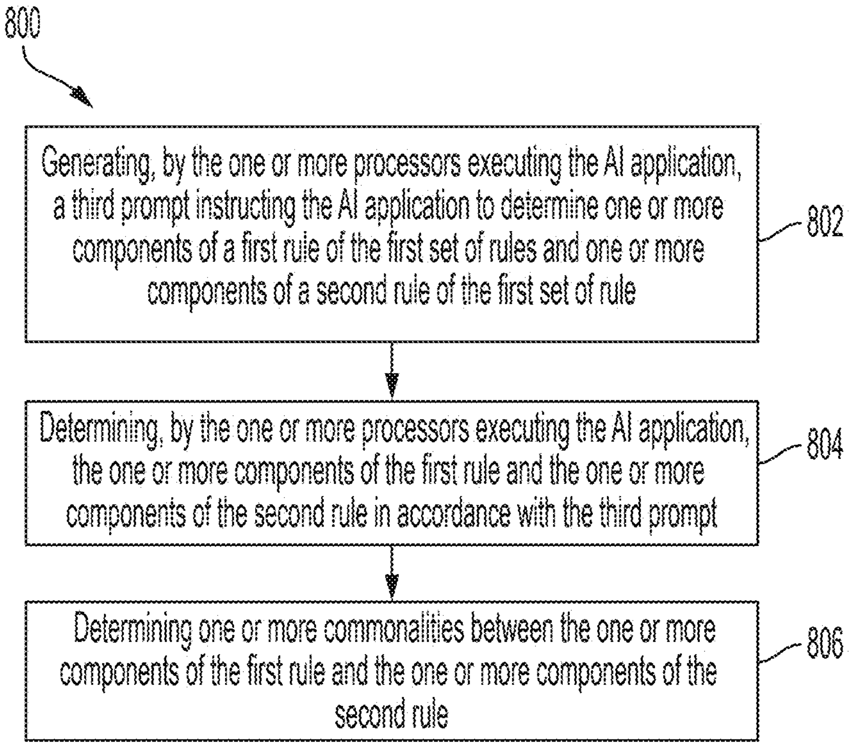
FIG. 8 is a flow chart of an example method for AI rule decomposition and commonality analysis according to some embodiments of the disclosure.

A flow chart diagram of an example method 800 for AI rule decomposition and commonality analysis is shown in FIG. 8. One or more operations of the method 800 may be performed by the processors 912 of FIG. 9. The method 800 may, for example, be performed by executing a machine learning model, such as an AI application, using the one or more processors. The method 800 may begin, at block 802, with generating, by the one or more processors executing the AI application, a third prompt instructing the AI application to determine one or more components of a first rule of the first set of rules and one or more components of a second rule for the first set of rules. For example, the prompt may include instructions for determining components of rules of the first set of two or more rules described with respect to block 502 of FIG. 5, such as instructions for decomposing the rules of the first set of two or more rules. As described herein, components may, for example, include steps, flows, and/or processes of the rules. For example, each component may include a code segment of each of the rules, such as a discrete code function of each of the rules.

At block 804, the one or more processors executing the AI application may determine the one or more components of the first rule and the one or more components of the second rule in accordance with the third prompt. For example, one or more LLMs of the AI application may execute the third prompt, and the one or more LLMs of the AI application may output the components of the first rule and the components of the second rule. In some examples, components of the rules may be determined even when the components are not common between two or more rules. For example, all components of each rule of the first set of two or more rules may be determined. Such components may be used as context in future component determination prompts, such as prompts for determination of components of other sets of rules or sampled subsets of sets of rules.

At block 806, the one or more processors executing the AI application may determine one or more commonalities between the one or more components of the first rule and the one or more components of the second rule. Determination of commonalities between rule components may be performed as part of the determination described with respect to blocks 504-508 of FIG. 5. For example, similarities between components may be computed as described with respect to blocks 504-508 of FIG. 5. In some examples, the second prompt may be generated at block 508 of FIG. 5 based on the determined rule components and the determined commonalities between the determined rule components. Accordingly rule decomposition may facilitate efficient consolidation of libraries of rules by allowing for comparison and consolidation of components of rules.

Figure 9:
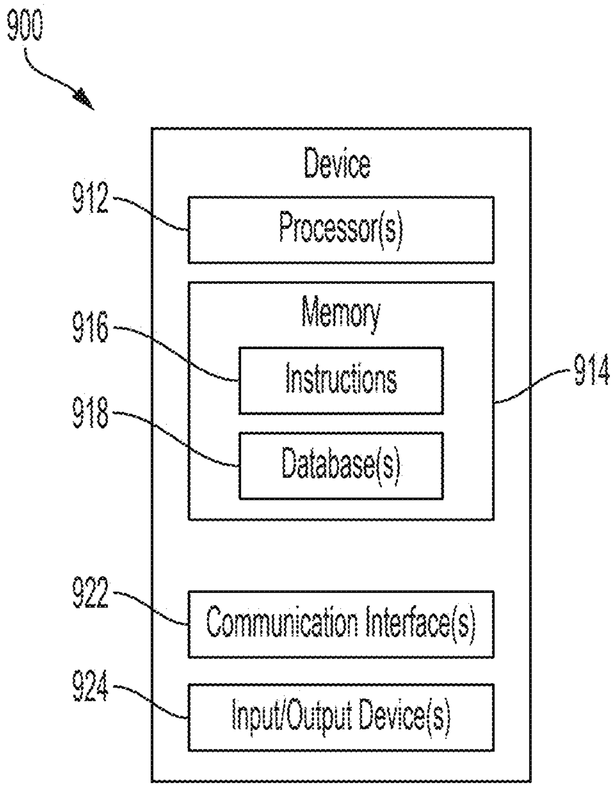
FIG. 9 is a block diagram of an example computing device for executing system for AI rule heuristics and distillation according to some embodiments of the disclosure.

A block diagram illustrating an example computing device 900 is shown in FIG. 9. The computing device 900 may, for example, be configured to implement part or all of the systems shown in FIGS. 1-4 and to perform one or more operations described with respect to FIGS. 5-8. In an example, the functionality described with respect to the device 900 may be implemented via a cloud, via a server, or via another type of computing device or multiple types of computing devices. In some aspects, multiple devices 900 may be used to enter machine learning model inputs and/or utilize AI applications, as described herein. The device 900 may receive such inputs and execute an AI application to generate one or more outputs based on such inputs, such as through distillation and rule heuristics, as described herein. In some examples the device 900 may receive inputs and outputs from one or more other devices and may generate, maintain, and execute rules, tools, and principles as described herein without locally executing a machine learning model to generate the outputs. The device 900 includes one or more processors 912, a memory 914, one or more communication interfaces 922, and one or more input/output (I/O) devices 924. Each of the one or more processors 912 may be a central processing unit (CPU), a graphics processing unit (GPU), or other computing circuitry (e.g., a microcontroller, one or more application specific integrated circuits (ASICs), and the like) and each processor 912 may have one or more processing cores. The memory 904 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 904 may store instructions 916 that, when executed by the one or more processors 912, cause the one or more processors 912 to perform the operations described with reference to FIGS. 1-8. The one or more communication interfaces 922 may be configured to communicatively couple the device 900 to one or more networks via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). The I/O devices 924 may include one or more display devices, a keyboard, a stylus, one or more touchscreens, a mouse, a trackpad, a camera, one or more speakers, haptic feedback devices, or other types of devices that enable a user to receive information from or provide information to the device 900.

The schematic or flow chart diagrams of FIGS. 5-8 are generally set forth as logical flow chart diagrams. As such, the depicted order and labeled steps are indicative of examples of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as AdaBoost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Clause 1: A method, comprising: receiving, by one or more processors executing an artificial intelligence (AI) application, a first set of two or more rules; determining, by the one or more processors executing the AI application, a first set of one or more commonalities between the two or more rules; generating, by the one or more processors executing the AI application, a second set of one or more rules based on the first set of one or more commonalities, wherein a number of rules of the second set of one or more rules is less than a number of rules of the first set of one or more rules; and determining one or more matches of an input data set in accordance with the second set of one or more rules.

Clause 2: The method of clause 1, further comprising: generating, by the one or more processors executing the AI application, a first prompt instructing the AI application to determine the first set of one or more commonalities between the two or more rules, wherein determining the first set of one or more commonalities is performed in accordance with the first prompt; and generating, by the one or more processors executing the AI application, a second prompt for instructing the AI application to generate the second set of one or more rules based on the first set of one or more commonalities, wherein generating the second set of one or more rules is performed in accordance with the second prompt.

Clause 3: The method of clause 2, wherein the AI application comprises one or more large language models (LLMs), wherein the first prompt is a first LLM prompt, and wherein the second prompt is a second LLM prompt.

Clause 4: The method of clause 1, further comprising: receiving, by one or more processors executing the artificial intelligence (AI) application, a second set of commonalities of the first set of two or more rules, wherein determining the first set of commonalities comprises modifying one or more commonalities of the second set of commonalities.

Clause 5: The method of clause 4, wherein determining the first set of commonalities further comprises adding one or more additional commonalities to the second set of commonalities.

Clause 6: The method of clause 1, wherein determining the first set of one or more commonalities comprises determining a first computer code segment of a first rule of the first set of two or more rules having a similarity above a threshold level to a second computer code segment of a second rule of the first set of two or more rules.

Clause 7: The method of clause 1, further comprising: determining, by the one or more processors executing the AI application, one or more components of the first rule and one or more components of the second rule, wherein determining the first set of one or more commonalities comprises determining one or more commonalities between the one or more components of the first rule and the one or more components of the second rule.

Clause 8: The method of clause 7, wherein determining the one or more commonalities between the one or more components of the first rule and the one or more components of the second rule comprises: linking the first rule and the second rule together in a graph with an edge strength associated with a number of components in common between the first rule and the second rule.

Clause 9: A system, comprising: a memory; and one or more processors communicatively coupled to the memory, the one or more processors configured to perform operations comprising: receiving, by an artificial intelligence (AI) application, a first set of two or more rules; determining, by the AI application, a first set of one or more commonalities between the two or more rules; generating, by the AI application, a second set of one or more rules based on the first set of one or more commonalities, wherein a number of rules of the second set of one or more rules is less than a number of rules of the first set of one or more rules; and determining one or more matches of an input data set in accordance with the second set of one or more rules.

Clause 10: The system of clause 9, further comprising: generating, by the AI application, a first prompt instructing the AI application to determine the first set of one or more commonalities between the two or more rules, wherein determining the first set of one or more commonalities is performed in accordance with the first prompt; and generating, by the AI application, a second prompt for instructing the AI application to generate the second set of one or more rules based on the first set of one or more commonalities, wherein generating the second set of one or more rules is performed in accordance with the second prompt.

Clause 11: The system of clause 10, wherein the AI application comprises one or more large language models (LLMs), wherein the first prompt is a first LLM prompt, and wherein the second prompt is a second LLM prompt.

Clause 12: The system of clause 9, wherein the one or more processors are further configured to perform operations comprising: receiving, by the artificial intelligence (AI) application, a second set of commonalities of the first set of two or more rules, wherein to determine the first set of commonalities, the one or more processors are further configured to perform operations comprising modifying one or more commonalities of the second set of commonalities.

Clause 13: The system of clause 12, wherein to determine the first set of commonalities the one or more processors are further configured to perform operations comprising adding one or more additional commonalities to the second set of commonalities.

Clause 14: The system of clause 9, wherein to determine the first set of one or more commonalities the one or more processors are further configured to perform operations comprising determining a first computer code segment of a first rule of the first set of two or more rules having a similarity above a threshold level to a second computer code segment of a second rule of the first set of two or more rules.

Clause 15: The system of clause 9, wherein the one or more processors are further configured to perform operations comprising: determining, by the AI application, one or more components of the first rule and one or more components of the second rule, wherein to determine the first set of one or more commonalities, the one or more processors are further configured to perform operations comprising determining one or more commonalities between the one or more components of the first rule and the one or more components of the second rule.

Clause 16: The system of clause 15, wherein to determine the one or more commonalities between the one or more components of the first rule and the one or more components of the second rule, the one or more processors are further configured to perform operations comprising: linking the first rule and the second rule together in a graph with an edge strength associated with a number of components in common between the first rule and the second rule.

Clause 17: A non-transitory computer-readable storage medium storing instructions that, when executed by one or more processors, cause the one or more processors to perform operations comprising: receiving, by an artificial intelligence (AI) application, a first set of two or more rules; determining, by the AI application, a first set of one or more commonalities between the two or more rules; generating, by the AI application, a second set of one or more rules based on the first set of one or more commonalities, wherein a number of rules of the second set of one or more rules is less than a number of rules of the first set of one or more rules; and determining one or more matches of an input data set in accordance with the second set of one or more rules.

Clause 18: The non-transitory computer-readable storage medium of clause 17, further storing instructions that, when executed by the one or more processors, cause the one or more processors to perform operations comprising: generating, by the AI application, a first prompt instructing the AI application to determine the first set of one or more commonalities between the two or more rules, wherein determining the first set of one or more commonalities is performed in accordance with the first prompt; and generating, by the AI application, a second prompt for instructing the AI application to generate the second set of one or more rules based on the first set of one or more commonalities, wherein generating the second set of one or more rules is performed in accordance with the second prompt.

Clause 19: The system of clause 18, wherein the AI application comprises one or more large language models (LLMs), wherein the first prompt is a first LLM prompt, and wherein the second prompt is a second LLM prompt.

Clause 20: The non-transitory computer-readable storage medium of clause 18, further storing instructions that, when executed by one or more processors, cause the one or more processors to perform operations comprising: receiving, by the artificial intelligence (AI) application, a second set of commonalities of the first set of two or more rules, wherein to determine the first set of commonalities, the non-transitory computer-readable storage medium further stores instructions that, when executed by the one or more processors, cause the one or more processors to perform operations comprising modifying one or more commonalities of the second set of commonalities.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, examples of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

receiving, by one or more processors executing an artificial intelligence (AI) application, a first set of two or more rules;

determining, by the one or more processors executing the AI application, a first set of one or more components of a first rule of the first set of two or more rules and a second set of one or more components of a second rule of the first set of two or more rules:

determining, by the one or more processors executing the AI application, a first set of one or more commonalities between the first set of one or more components of the first rule and the second set of one or more components of the second rule, wherein determining the first set of one or more commonalities comprises determining a first computer code segment of a first component of the first set of one or more components of the first rule having a similarity to a second computer code segment of a second component of the second set of one or more components of the second rule above a threshold level;

generating, by the one or more processors executing the AI application, a second set of one or more rules based on the first set of one or more commonalities, wherein the second set of one or more rules includes fewer components than the first set of two or more rules; and determining one or more matches of an input data set in accordance with the second set of one or more rules.

2. The method of claim 1, further comprising:

generating, by the one or more processors executing the AI application, a first prompt instructing the AI application to determine the first set of one or more commonalities, wherein determining the first set of one or more commonalities is performed in accordance with the first prompt; and generating, by the one or more processors executing the AI application, a second prompt for instructing the AI application to generate the second set of one or more rules based on the first set of one or more commonalities, wherein generating the second set of one or more rules is performed in accordance with the second prompt.

3. The method of claim 2, wherein the AI application comprises one or more large language models (LLMs), wherein the first prompt is a first LLM prompt, and wherein the second prompt is a second LLM prompt.

4. The method of claim 1, further comprising:

receiving, by one or more processors executing the artificial intelligence (AI) application, a second set of commonalities of the first set of two or more rules, wherein determining the first set of commonalities comprises modifying one or more commonalities of the second set of commonalities.

5. The method of claim 4, wherein determining the first set of commonalities further comprises adding one or more additional commonalities to the second set of commonalities.

6. The method of claim 1 wherein determining the one or more commonalities between the first set of one or more components of the first rule and the second set of one or more components of the second rule comprises:

linking the first rule and the second rule together in a graph with an edge strength associated with a number of components in common between the first rule and the second rule.

7. The method of claim 1, wherein a number of rules of the second set of one or more rules is less than a number of rules of the first set of one or more rules, and wherein the second set of one or more rules requires less computer storage space than the first set of two or more rules.

8. A system, comprising:

a memory; and one or more processors communicatively coupled to the memory, the one or more processors configured to perform operations comprising:

receiving, by an artificial intelligence (AI) application, a first set of two or more rules;

determining, by the AI application, a first set of one or more components of a first rule of the first set of two or more rules and a second set of one or more components of a second rule of the first set of two or more rules;

determining, by the AI application, a first set of one or more commonalities between the first set of one or more components of the first rule and the second set of one or more components of the second rule, wherein to determine the first set of one or more commonalities the one or more processors are further configured to perform operations comprising determining a first computer code segment of a first component of the first set of one or more components of the first rule having a similarity to a second computer code segment of a second component of the second set of one or more components of the second rule above a threshold level;

generating, by the AI application, a second set of one or more rules based on the first set of one or more commonalities, wherein the second set of one or more rules includes fewer components than the first set of two or more rules; and determining one or more matches of an input data set in accordance with the second set of one or more rules.

9. The system of claim 8, further comprising:

generating, by the AI application, a first prompt instructing the AI application to determine the first set of one or more commonalities, wherein determining the first set of one or more commonalities is performed in accordance with the first prompt; and generating, by the AI application, a second prompt for instructing the AI application to generate the second set of one or more rules based on the first set of one or more commonalities, wherein generating the second set of one or more rules is performed in accordance with the second prompt.

10. The system of claim 9, wherein the AI application comprises one or more large language models (LLMs), wherein the first prompt is a first LLM prompt, and wherein the second prompt is a second LLM prompt.

11. The system of claim 8, wherein the one or more processors are further configured to perform operations comprising:

receiving, by the artificial intelligence (AI) application, a second set of commonalities of the first set of two or more rules, wherein to determine the first set of commonalities, the one or more processors are further configured to perform operations comprising modifying one or more commonalities of the second set of commonalities.

12. The system of claim 11, wherein to determine the first set of commonalities the one or more processors are further configured to perform operations comprising adding one or more additional commonalities to the second set of commonalities.

13. The system of claim 8, wherein to determine the one or more commonalities between the first set of one or more components of the first rule and the second set of one or more components of the second rule, the one or more processors are further configured to perform operations comprising:

linking the first rule and the second rule together in a graph with an edge strength associated with a number of components in common between the first rule and the second rule.

14. The system of claim 8, wherein a number of rules of the second set of one or more rules is less than a number of rules of the first set of one or more rules, and wherein the second set of one or more rules requires less computer storage space than the first set of two or more rules.

15. A non-transitory computer-readable storage medium storing instructions that, when executed by one or more processors, cause the one or more processors to perform operations comprising:

receiving, by an artificial intelligence (AI) application, a first set of two or more rules;

determining, by the AI application, a first set of one or more components of a first rule of the first set of two or more rules and a second set of one or more components of a second rule of the first set of two or more rules;

determining, by the AI application, a first set of one or more commonalities between the first set of one or more components of the first rule and the second set of one or more components of the second rule, wherein to determine the first set of one or more commonalities the non-transitory computer-readable storage medium further stores instructions that, when executed by the one or more processors, cause the one or more processors to perform operations comprising determining a first computer code segment of a first component of the first set of one or more components of the first rule having a similarity to a second computer code segment of a second component of the second set of one or more components of the second rule above a threshold level;

generating, by the AI application, a second set of one or more rules based on the first set of one or more commonalities, wherein the second set of one or more rules includes fewer components than the first set of two or more rules;

determining one or more matches of an input data set in accordance with the second set of one or more rules.

16. The non-transitory computer-readable storage medium of claim 15, further storing instructions that, when executed by the one or more processors, cause the one or more processors to perform operations comprising:

generating, by the AI application, a first prompt instructing the AI application to determine the first set of one or more commonalities, wherein determining the first set of one or more commonalities is performed in accordance with the first prompt; and generating, by the AI application, a second prompt for instructing the AI application to generate the second set of one or more rules based on the first set of one or more commonalities, wherein generating the second set of one or more rules is performed in accordance with the second prompt.

17. The non-transitory computer-readable storage medium of claim 16, wherein the AI application comprises one or more large language models (LLMs), wherein the first prompt is a first LLM prompt, and wherein the second prompt is a second LLM prompt.

18. The non-transitory computer-readable storage medium of claim 16, further storing instructions that, when executed by one or more processors, cause the one or more processors to perform operations comprising:

receiving, by the artificial intelligence (AI) application, a second set of commonalities of the first set of two or more rules, wherein to determine the first set of commonalities, the non-transitory computer-readable storage medium further stores instructions that, when executed by the one or more processors, cause the one or more processors to perform operations comprising modifying one or more commonalities of the second set of commonalities.

19. The non-transitory computer-readable storage medium of claim 16, wherein a number of rules of the second set of one or more rules is less than a number of rules of the first set of one or more rules, and wherein the second set of one or more rules requires less computer storage space than the first set of two or more rules.

* * * * *